(12) United States Patent
Miskovic et al.

(10) Patent No.: US 12,361,010 B2
(45) Date of Patent: Jul. 15, 2025

(54) HIERARCHICAL SCORING SYSTEM FOR DISTRIBUTED NETWORKS

(71) Applicant: Gluware IP, LLC, Sacramento, CA (US)

(72) Inventors: Stanislav Miskovic, San Jose, CA (US); Olivier Huynh Van, Sacramento, CA (US); Tim Silverline, San Ramon, CA (US); Kyle Scarmardo, Dallas, TX (US); Kevin Irwin, Flower Mound, TX (US); Jeffrey T. Boone, El Dorado Hills, CA (US); Ernest J. Lefner, IV, Flower Mound, TX (US)

(73) Assignee: Gluware IP, LLC, Sacramento, CA (US)

(*) Notice: Subject to any disclaimer, the term of this patent is extended or adjusted under 35 U.S.C. 154(b) by 0 days.

(21) Appl. No.: 18/179,039

(22) Filed: Mar. 6, 2023

(65) Prior Publication Data
US 2024/0303242 A1    Sep. 12, 2024

(51) Int. Cl.
*G06F 16/2457* (2019.01)
*G06F 11/34* (2006.01)

(52) U.S. Cl.
CPC .... *G06F 16/24575* (2019.01); *G06F 11/3495* (2013.01)

(58) Field of Classification Search
CPC .............. G06F 11/3495; G06F 16/24575
See application file for complete search history.

(56) References Cited

U.S. PATENT DOCUMENTS

| | | | |
|---|---|---|---|
| 9,721,367 B2 * | 8/2017 | Ryu | G06T 11/60 |
| 9,723,367 B1 * | 8/2017 | Long | H04N 21/4751 |
| 9,886,338 B1 | 2/2018 | Khokhar et al. | |
| 2010/0131473 A1 | 5/2010 | Bjork et al. | |
| 2016/0150451 A1 * | 5/2016 | Barreto De Miranda Sargento | H04W 36/1446 370/332 |
| 2017/0149813 A1 * | 5/2017 | Wright | H04L 63/1416 |
| 2018/0239682 A1 | 8/2018 | Kaluza et al. | |
| 2021/0240703 A1 * | 8/2021 | Anamanamuri | G06F 16/2471 |
| 2022/0103592 A1 | 3/2022 | Semel et al. | |

(Continued)

*Primary Examiner* — Jigar P Patel
(74) *Attorney, Agent, or Firm* — Mintz Levin Cohn Ferris Glovsky and Popeo, P.C.

(57) ABSTRACT

A method of determining scores specific to a system is provided. The method comprises determining scores based on data associated with a component configuration, classifying the scores with respect to categories and subcategories, generating an aggregate score representative of a total performance of a component configuration, the generating including: generating a first category score specific to a first category and a second category score specific to a second category, performing normalization operations on the first category score and the second category score, wherein the first category score is representative of a first characteristic of the component configuration and the second category score representative of a second characteristic of the component configuration, combining the first normalized category score with the second normalized category score, and providing the aggregate score representative of an aggregate performance of the component configuration based on the first characteristic and the second characteristic.

22 Claims, 8 Drawing Sheets

(56) References Cited

U.S. PATENT DOCUMENTS

| | | | |
|---|---|---|---|
| 2023/0179493 A1* | 6/2023 | Jiwani | H04L 41/142 455/423 |
| 2023/0328084 A1* | 10/2023 | Narayanan | G06F 21/566 726/23 |

* cited by examiner

HIERARCHICAL SCORING SYSTEM FOR DISTRIBUTED NETWORKS

TECHNICAL FIELD

The subject matter described herein generally relates to techniques of analyzing various types of systems.

BACKGROUND

Various types of systems include devices with different capabilities and functionalities. These systems operate to perform tasks of varying complexity. During operations of these systems, information or data relating to operations of the devices included within these systems may be gathered for additional analysis. These systems may be implemented or utilized as part of the information technology infrastructure of companies, governments, individual consumers, and so forth. For example, manufacturing companies, information technology companies, universities, agricultural companies, and so forth, may utilize these systems to perform various tasks. However, as there are several types of devices and each of these devices have significant differences in terms of capabilities, functionalities, and so forth, efficient troubleshooting, monitoring, and administering of these systems becomes difficult.

As such, there is a need for a system that enables better analysis and interpretation of data generated by devices of varying capabilities and functionalities for facilitating efficient troubleshooting and administration.

SUMMARY

Systems and methods for generating scores specific to various aspects of a system are provided. In one aspect, there is provided a computer-implemented method comprising: determining scores based on data associated with a component configuration; classifying the scores with respect to categories and one or more subcategories associated with each of the categories, the scores characterizing aspects of the component configuration; generating an aggregate score representative of a total performance of the component configuration, the generating including: generating a first category score specific to a first category of the categories and a second category score specific to a second category of the categories, performing normalization operations on the first category score and the second category score, wherein the first category score is representative of a first characteristic of the component configuration and the second category score representative of a second characteristic of the component configuration; combining the first category score that is normalized with the second category score that is normalized; and providing the aggregate score representative of the total performance of the component configuration.

In some aspects, the generating of the first category score comprises: determining a first subcategory score associated with a first subcategory specific to the first category and a second subcategory score associated with a second subcategory specific to the first category, and combining the first subcategory score and the second subcategory score. In some aspects, the generating of the second category score comprises: determining a first subcategory score associated with a first subcategory specific to the second category and a second subcategory score associated with a second subcategory specific to the second category, and combining the first subcategory score associated with the first subcategory specific to the second category and the second subcategory score associated with the second subcategory specific to the second category.

In some aspects, the generating of the first category score includes applying a first weighting parameter to the combination of the first subcategory score specific to the first category and the second subcategory score specific to the first category and the generating of the second category score includes applying a second weighting parameter to the combination of the first subcategory score specific to the second category and the second subcategory score specific to the second category, wherein the first weighting parameter is larger than the second weighting parameter.

In some aspects, implementing an action specific to at least a device included in the component configuration, and generating an additional aggregate score representative of a different aggregate performance of the component configuration.

In some aspects, the action specific to the device includes one or more of a memory allocation, a firmware update, a communication path assignment, selection of authentication processes, or an assignment of access control policies; and the data associated with the device includes a plurality of numeric characters and a plurality of non-numeric values.

In another aspect, the determining of the scores comprises performing conversion operations on the plurality of non-numeric values and the performing of the conversion operations comprises corresponding the plurality of non-numeric values to numeric values in a range of 0 to 10. In some aspects, the plurality of non-numeric values correspond to an AES algorithm and a DES algorithm.

In some aspects, the first category score is representative of a volume of forwarded data relative to a device of the component configuration, volume of dropped traffic sessions relative to one or more devices of the component configuration, a number of traffic sessions, or communication paths between devices of the component configuration; and the second category score is representative of access delays based on authentication processes relative to the one or more devices of the component configuration or alerts associated with detections relative to one or more of devices of the component configuration.

In another aspect, a system comprises at least one data processor, and at least one memory storing instructions, which when executed by the at least one data processor, cause operations comprising: determining scores based on data associated with a component configuration, classifying the scores with respect to categories and one or more subcategories associated with each of the categories, the scores characterizing aspects of the component configuration, generating an aggregate score representative of a total performance of the component configuration, the generating including: generating a first category score specific to a first category of the categories and a second category score specific to a second category of the categories, performing normalization operations on the first category score and the second category score, wherein the first category score is representative of a first characteristic of the component configuration and the second category score representative of a second characteristic of the component configuration, combining the first category score that is normalized with the second category score that is normalized, and providing the aggregate score representative of an aggregate performance of the component configuration based on the first characteristic and the second characteristic.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
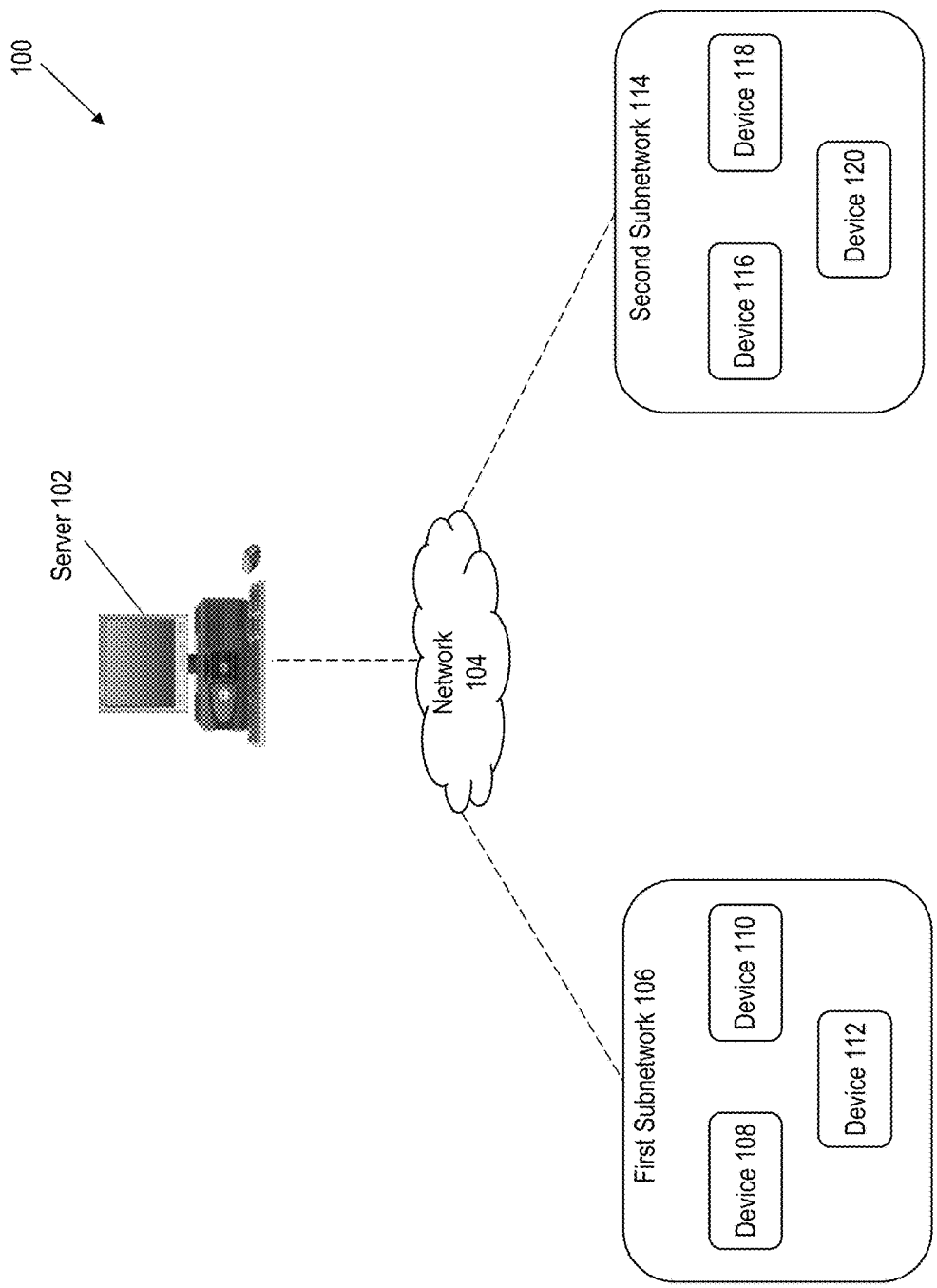
FIG. 1A depicts a distributed network in which a scoring system of the present disclosure may be implemented, according to one or more embodiments described and illustrated herein.

As described above, systems (e.g., distributed systems) are utilized by various companies to perform various tasks of different complexities. For example, manufacturing companies, information technology companies, universities, agricultural companies, and so forth, may utilize systems of varying levels of complexity to perform various tasks. However, as these systems include devices with different functionalities and capabilities, with each device utilizing potentially different ways of generating reports regarding various aspects of the operations of these devices, efficiently and effectively troubleshooting, monitoring, and administering these systems may prove time and resource intensive. Additionally, as these devices vary significantly in terms of capabilities and functionalities, any data that is generated by these devices requires significant manual labor to analyze and interpret. Further, due to the differences between the devices of these systems, the devices fail to integrate well with each other. As such, as described above, a system for enabling efficient troubleshooting, monitoring, and administration of these systems is contemplated. Broadly speaking, vendors and manufacturing companies have various differences, as do the devices that are produced and sold by them. Additionally, the conditions in which these devices operate to generate digital reports and the conditions in which these devices do not generate reports also vary. As such, conventionally, it is difficult to align all of these diverse conditions in a manner that is useful for users and operators.

In particular, systems, e.g., distributed networks, non-distributed networks, and various other assemblies of components, may include complex configurations of devices and/or subnetworks that present challenges associated with monitoring the performance of these devices and subnetworks. For example, configurations of these devices and various digital reports generated by these devices may not clearly indicate whether the system is operating effectively. Configurations of devices and digital reports generated by these devices may provide partial information regarding operation of these devices, but may fail to provide a complete and comprehensive picture of the operation of the system in which these devices operate.

For example, as vendors and manufacturing companies vary significantly, so do the devices that are produced and sold by these vendors and companies. As such, the configurations of these devices, and the conditions in which these devices operate to generate digital reports and the conditions in which these devices do not generate reports also vary significantly. Further, due to the variability of these devices, configuring devices to operate as intended may pose various challenges. Additionally, the variability of these devices and of the configurations of these devices results in human errors, internal failures, data traffic congestions, and so forth. The sheer volume of data generated by these devices (in varying formats) also presents various challenges.

A scoring system as described in the present disclosure addresses and overcomes the above described challenges. In particular, the scoring system of the present disclosure operates to gather data from a variety of different devices that may be operating within clusters, sites, or subnetworks included as part of a system such as, e.g., a distributed system. The distributed system may include one or more networks operating independently or in isolation or in conjunction with each other. In aspects, the scoring system of the present disclosure may be applied to a single distributed network operating within the distributed system, to multiple or all of the distributed networks operating within the distributed system, and so forth. In aspects, the distributed system may include one or more distributed networks and/or one or more configuration of devices that are different from a distributed network. In aspects, the scoring system of the present disclosure may be implemented on a non-distributed system, namely a system in which all of the components or devices of the system are included in the same location.

In aspects, a particular distributed network may include a plurality of devices having varying capabilities and functionalities. In aspects, the scoring system may operate to gather data, in real time or approximately in real time, at fixed time intervals, at a particular user designated time, at a random time, and so forth, from each of these devices, and determine scores that are specific to one or more of these devices. In aspects, a step in the process of determining these scores may include normalizing numeric and non-numeric values included in the data obtained from these devices. The determined scores may be classified within various categories and subcategories, one or more of which may be edited or deleted. Additional categories or subcategories may be added as well. Further, one or more of these scores may be weighted in accordance with a weighting parameter, which enables a user to assign a higher level of importance or priority to a particular device, feature, or function relative to another device, feature, or function. Thereafter, an overall score may be determined by aggregating the scores within subcategories of a particular category and aggregating scores across categories. In this way, a diverse and in-depth analysis of a distributed network is feasible, thereby enabling an accurate and comprehensive understanding of the quality of operation of a distributed network. It is noted that the scoring system may also be implemented on a non-distributed network.

In aspects, the scoring system of the present disclosure monitors and analyzes the operational state of a distributed network prior to and after the deployment of various actions or configurations, in addition to analyzing various actions associated with the distributed network, e.g., the speed of a distributed network after a software upgrade is provided to a plurality of devices in the network, memory allocation relative to one or more of the devices, and so forth. As such, the scoring system of the present disclosure simplifies the manner in which a complex distributed network is monitored, operated, and administered. The scoring system also improves the ability of system operators, engineers, etc., to troubleshoot problems associated with various devices of the distributed network with greater ease. In part because various aspects of the distributed network may be represented by a normalized score. Such a score enables the system operators to assess the performance of an aspect of the network based on the score satisfying a particular threshold. It is noted that a normalization operation or normalization may not be involved in the generating of the score.

The scoring system also enables the identification, tracing, and monitoring, and analysis of the results of one or more management actions, e.g., initiation of a software update, a memory allocation, a firmware update, a communication path assignment, selection of authentication processes, an assignment of access control policies, and so forth, approximately in real time. For example, digital reports may be generated based on these actions, and scores may be generated based on analyzing the management actions and these digital reports to provide IT professionals, engineers, and others with a near real time assessment of the overall performance of the distributed network. For example, based on these scores and reports, system operators may be able determine if a particular device within the distributed network or an aspect of the distributed network was inaccessible for a particular period of time, e.g., due to a security setting or resource failure. Additionally, based in part on the scores that are generated, system operators may be able to identify a source of a problem (e.g., localize a particular problem) with greater ease. Further, the scoring system enables operators to conduct root cause analysis based on the generation of one or more scores. It is noted that the scoring system of the present disclosure may be implemented on distributed networks, non-distributed network, distributed systems, non-distributed systems, and so forth.

The scoring system of the present disclosure provides numerous advantages to users and operators. The scoring system enables users and operators to systematically determine the quality of any and all configuration decisions and management actions that may be applied to a system (e.g., a distributed network or a non-distributed network), and facilitates an analysis of the history of the scores of various configurations. Based on this information, users and operators may be able to determine which configurations of devices or management actions would be most suitable for effective operation of a system, parts of the system, aspects of the system, and so forth. The scoring system, which utilizes categories and subcategories, operates to characterize various aspects of the operation of a system. Further, it is noted that the generation of scores by the scoring system described herein may be specific to a particular management action or a set of management actions, e.g., a software update, a firmware upgrade, and so forth. Additionally, the modification of one or more devices of the system, e.g., inclusion of a new device to the system or removal of an existing device from the system, may impact the score such that another iteration of the implementation of the scoring system to the modified system may result in an entirely new set of scores, including a new aggregate score for the entire system.

FIG. 1A depicts a distributed network 100 in which the scoring system of the present disclosure may be implemented, according to one or more embodiments described and illustrated herein. In aspects, as illustrated in FIG. 1, the distributed network 100 may comprise a server 102 that is communicatively coupled, via a communication network 104, to a plurality of devices, a subset of which may be included as part of a first subnetwork 106 and another subset of which may be included as part of a second subnetwork 114. The communication network 104 may be a wired communication network or a wireless communication network that may utilize a plurality of communication protocols, TCP/IP protocol, UDP, and so forth. It is noted that other comparable protocols may also be utilized. In aspects, the first subnetwork 106 may include devices 108, 110, and 112, and the second subnetwork 114 may include devices 116, 118, and 120. It is noted that the distributed network 100 may include a variety of other devices instead of or in addition to the devices illustrated as part of the distributed network 100. For example, in aspects, the distributed network 100 may include multiple servers that are comparable to or different from the server 102, and a plurality of subnetworks instead of or in addition to the first subnetwork 106 and the second subnetwork 114, with each of the plurality of subnetworks including one or more devices with capabilities that are comparable to or which vary from the capabilities of the devices included in the first subnetwork 106 and the second subnetwork 114.

In aspects, the devices 108, 110, and 112 of the first subnetwork 106 may operate to interface with each other, share data with each other, and communicate data to the server 102 via the communication network 104. Similarly, in aspects, the devices 116, 118, and 120 of the second subnetwork 114 may operate to interface with each other, share data with each other, and communicate data to the server 102 via the communication network 104. In other aspects, the devices 108, 110, and 112 of the first subnetwork 106 may be isolated from the devices 116, 118, and 120 of the second subnetwork 114 such that these devices may not be able to communicate with each other and/or may have to perform authentications prior to communicating or sharing information with each other. In aspects, the distributed network 100 may correspond to or be included as part of a variety of applications such as, e.g., computer systems, communication systems, information technology systems, irrigation systems, systems implemented by pharmaceutical companies for drug development, and so forth.

Figure 1B:
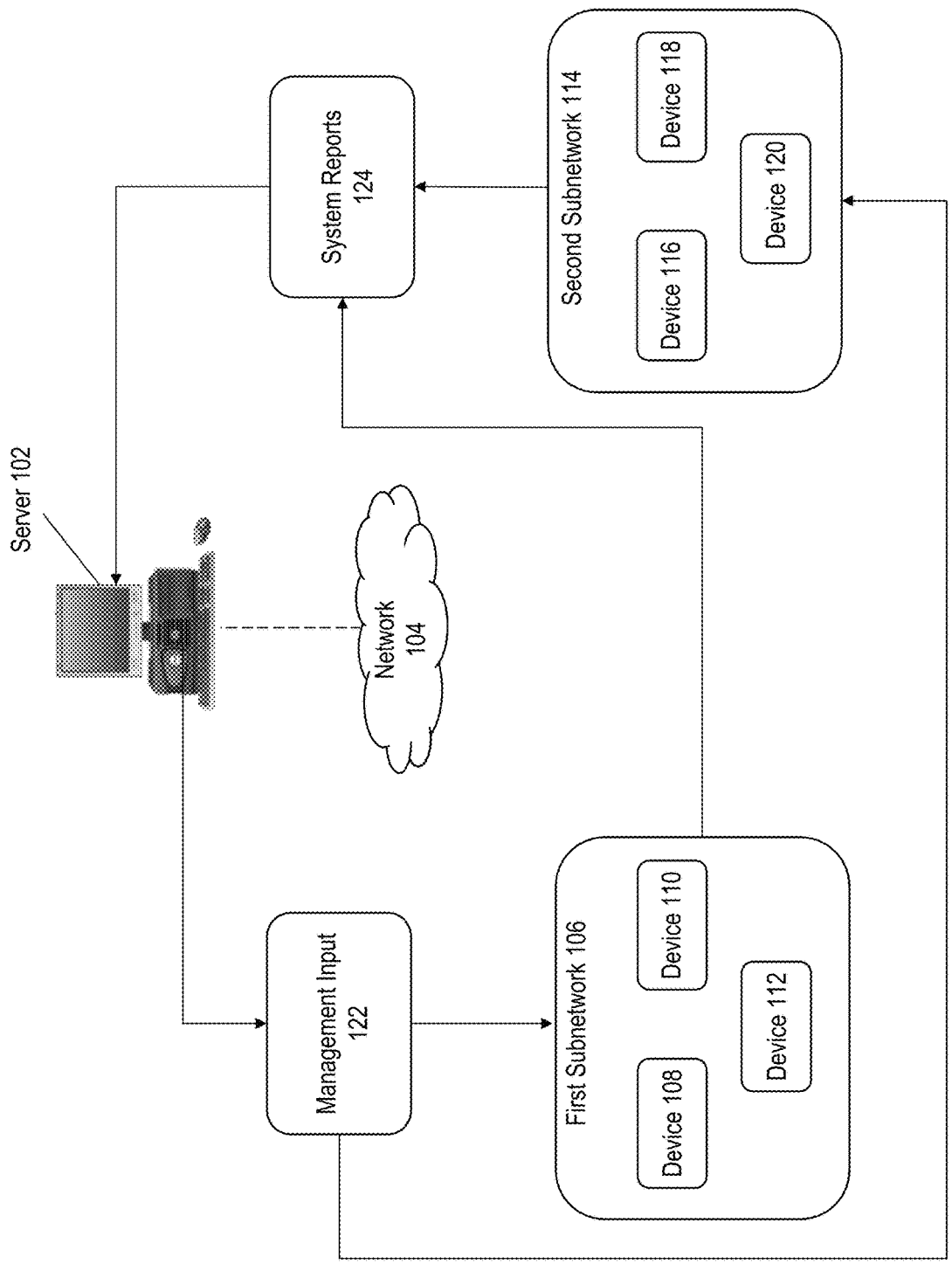
FIG. 1B depicts a framework of the distributed network in which the scoring system of the present disclosure may be implemented, according to one or more embodiments described and illustrated herein.

FIG. 1B depicts a framework of the distributed network 100 in which the scoring system of the present disclosure may be implemented, according to one or more embodiments described and illustrated herein. In aspects, FIG. 1B depicts the server 102 that may be operated by a system operator for initiating a management input 122 relative to the devices 108, 110, and 112 in the first subnetwork 106 and the devices 116, 118, and 120 in the second subnetwork 114. In aspects, the management input 122 corresponds to an administrative action performed on the distributed network 100. In aspects, the management input 122 may correspond to the implementation of an action relative to one or more of the devices included in the first subnetwork 106 and the second subnetwork 114. For example, the action may be an input associated with memory allocation, firmware updates transmitted to one or more of the devices, a communication path assignment to one or more devices, a selection of authentication processes, and/or an assignment of access control policies. In aspects, the authentication processes may involve choosing protocols and processes from different authentication technologies and vendors. For example, processes associated with Advanced Encryption Standard (AES) based algorithm may be applied in association with the devices in the first subnetwork 106 and a Data Encryption Standard (DES) based algorithm may be applied in association with the devices in the second subnetwork 114. Other examples of the action may include traffic throttling or rate limiting policies, devising processes for detecting attacks on the distributed network, setting up an hourly schedule for performing various actions autonomously, altering vaccine formulae, and so forth.

In aspects, system reports 124 may correspond to outputs generated by one or more of the devices included in each of the first subnetwork 106 and the second subnetwork 114. Thereafter, scores may be generated based on the generated reports and aggregated scores may be generated that are representative of the first subnetwork 106 and the second subnetwork 114, e.g., performance of the first subnetwork 106 and the second subnetwork 114, respectively. For example, these outputs may result from the initiation of the management input 122 and may correspond to, e.g., digital reports that measure utilization of resources (e.g., memory used by the devices in each subnetwork), a number of current active processes, user related feedback related to various devices, and so forth. Other examples of outputs may include digital reports that describe the volume of data traffic that is transmitted or dropped by these devices, a number of traffic sessions, the number of destinations associated with specific paths or links, and so forth. Other examples of the outputs may correspond to, e.g., metrics or other data characterizing denied or dropped traffic associated with various devices for various users, access delays due to implementation of authentication mechanisms, digital reports characterizing air temperature, air humidity, hourly exposure to various sections of an agricultural irrigation system, height of plants, feedback relating to crop quality, and so forth. Examples of outputs also include data characterizing the time it takes for a vaccine to develop immunity, reaction of an immune system, measurements of various side effects such as, e.g., blood pressure, oxygen saturation, and so forth.

Further, it is noted that, the scoring system of the present disclosure may enable generation of aggregate scores for organizational hierarchies. For example, a first level of the organizational hierarchy may correspond to various sites or subnetworks of a company such as, e.g., (EMEA, APAC, headquarters of a company, branch offices of a company within a country, and so forth), while a second level of the hierarchy may correspond to departments within each of the, e.g., companies. In another example, the first level of the organizational hierarchy may correspond to various subsidiaries of a particular corporation that are located or headquartered in different countries and a second level may correspond to various departments within each of these subsidiary companies. At the second level, the scoring system may generate distinct scores for each department within a particular subsidiary company and an aggregate score for the departments. Further, the scoring system may also generate distinct scores for each subsidiary company of a corporation and generate aggregate scores for the various subsidiary companies as a whole. As such, implementation of the scoring system of the present disclosure may enable users and operators to better understand how a particular department in one subsidiary company is operating with respect to another department within the same subsidiary company, and the impact (positive or negative) that a department may be having on the overall operation of a company. Similarly, the implementation of the scoring system of the present disclosure may enable users and operators to better understand how a particular subsidiary company (e.g., within a large corporation) is operating relative to another subsidiary company (e.g., within the large corporation) by enabling a data driven and metrics based comparison of similar or identical departments within each subsidiary company.

Figure 1C:
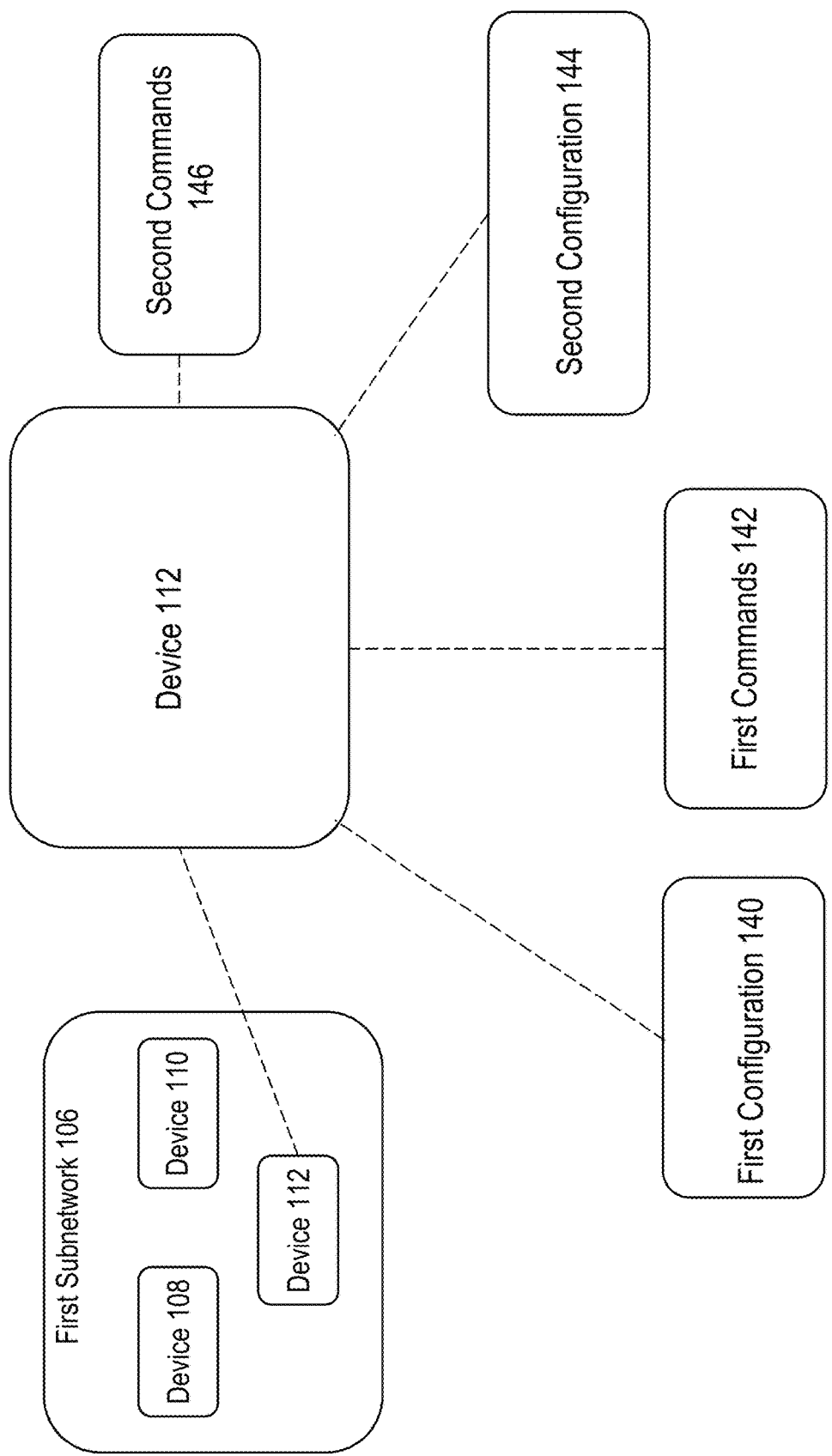
FIG. 1C depicts an example operation of the device of the first subnetwork, according to one or more embodiments described and illustrated herein.

FIG. 1C depicts an example operation of the device 112 of the first subnetwork 106, according to one or more embodiments described and illustrated herein. For example, as illustrated in FIG. 1C, a first configuration 140 and a second configuration 144 may be digital files that include different data forwarding paths such as the paths along which data packets may be transmitted, including from one of the device 108 to the device 110, which in turn may transmit the data packets to another location. Additionally, in aspects, the first and second configurations 140, 144, may include files with default settings, initial settings, options, preferences, and various parameters that govern the manner in which the device 112 operates. Additionally, in aspects, software updates, firmware upgrades, and so forth, may be provided to the device 112 via the first commands 142 and the second commands 146. In aspects, the first commands 142 and the second commands 146 may be initiated or provided to the device 112 by the server 102 via, e.g., the communication network 104. In aspects, these commands may be based on, e.g., Cisco IOS commands and configurations, Juniper JunOS commands and configurations, and so forth.

In aspects, it is noted that the distributed network 100 may be modified to include physical resources in the form of, e.g., physical connections (e.g., cables) to each of the devices, replacing new devices to the network, adding resources to various devices, e.g., processors, memory, interface cards, and so forth. The scoring system of the present disclosure may operate to identify, track, and determine the operating conditions of these devices, e.g., in real time, approximately in real time, at fixed time intervals, at a particular user designated time, at a random time, and so forth, in order to determine whether the distributed network 100 operates at a satisfactory level. The satisfactory level may be determined based on comparing, e.g., an overall aggregate score with a particular threshold.

Figure 2:
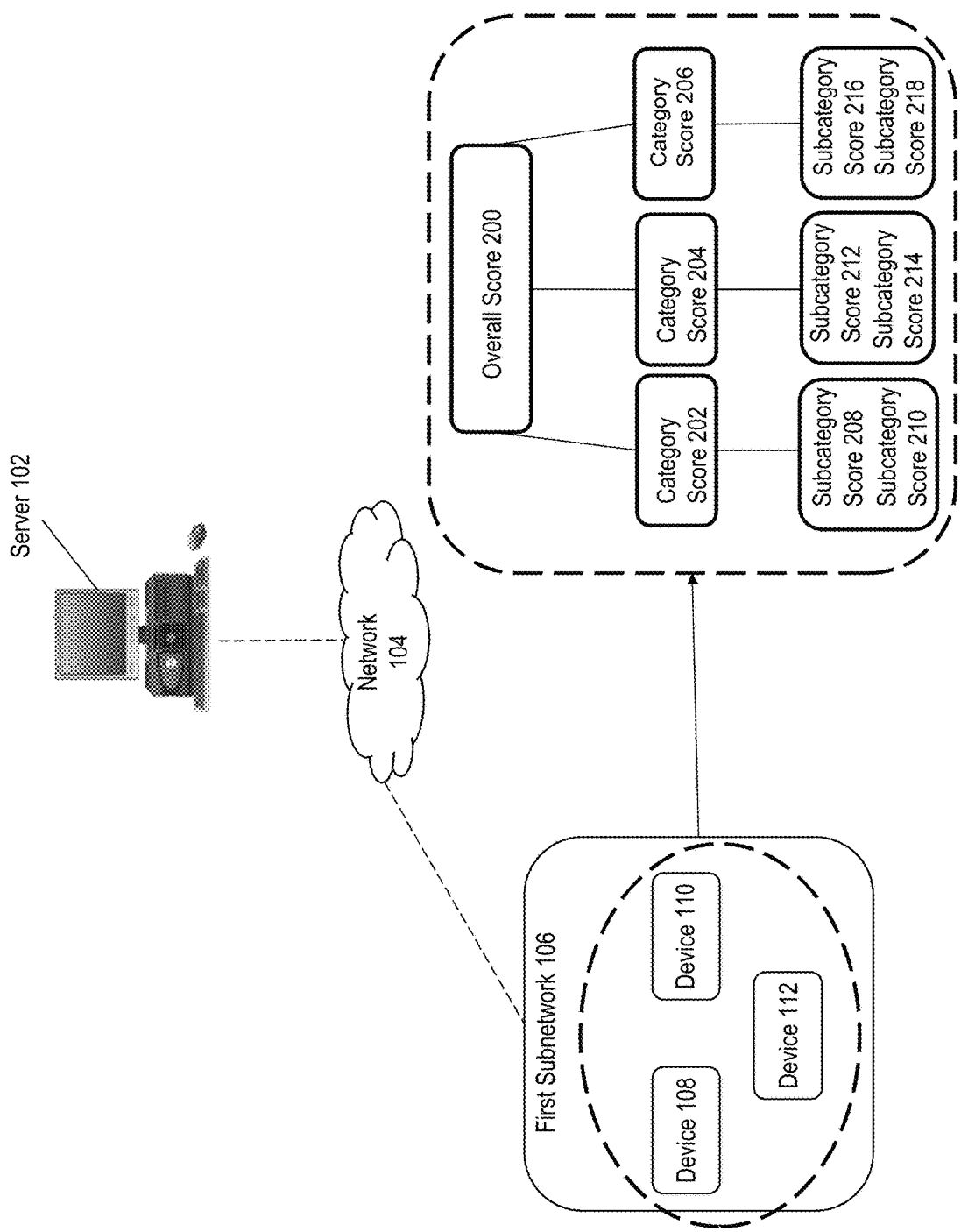
FIG. 2 depicts a representation of an implementation of the scoring system as described in the present disclosure with respect to the first subnetwork, according to one or more embodiments described and illustrated herein.

FIG. 2 depicts a representation of an implementation of the scoring system as described in the present disclosure with respect to the first subnetwork 106, according to one or more embodiments described and illustrated herein. For example, in aspects, the devices 108, 110, and 112 may be different devices with different capabilities and functionalities and may have different power requirements. For example, the device 108 may be a hub or a router, while devices 110 and 112 may be client devices such as laptops, desktops, smartphones, iPads, servers, and other comparable devices. In other aspects, the devices 110 and 112 may be sensors that are disposed on machinery or equipment located on a factory floor, with each sensor belonging to a different vendor or manufacturer, while the device 108 may be a computer device or a subnetwork server that is communicatively coupled with the devices 110 and 112, e.g., via a wired or wireless connection. In other aspects, each of the devices 108, 110, and 112 may be computing devices with operating systems and software applications that are associated with different vendors or providers.

In aspects, data relating to the operation of each of the devices 108, 110, and 112 within the first subnetwork 106 may be obtained, e.g., in real time, approximately in real time, at fixed time intervals, at a particular user designated time, at a random time, and so forth, and shared with the server 102. For example, the data characterizing current power consumption levels, memory usage, resource utilization, access security, interfacing between the devices 108, 110, and 112 and the sharing of data between these devices, and so forth, may be communicated, via the communication network 104, to the server 102. In other aspects, data that is collected regarding the devices 108, 110, and 112 and the first subnetwork 106 may include event logs (e.g., System logging protocol ("Syslogs") logs or Simple Network Management Protocol ("SNMP" logs), telemetry feeds, results of command line interface commands, internal metrics specific to the operating systems of the devices 108, 110, and 112, and so forth. Additionally, in aspects, it is noted that collection of data may be in response to or via queries, e.g., periodic or on demand transmission of command line interface, based on representational state transfer (REST) commands, via triggered collections (e.g., when a device, automatically and without user intervention, transmits digital reports upon the occurrence of a triggering condition or an event), during scheduled collections (e.g., at certain fixed intervals), and so forth.

In other aspects, data may correspond to digital reports that are generated regarding various components within each of the devices 108, 110, and 112. These reports may include data regarding data traffic passing through each of these devices, interface states associated with each of these devices (e.g., enabled interface state, disabled interface state, and so forth), etc. The data may also characterize whether appropriate cables are connected to the interfaces of these devices, whether particular interface cards are present in various slots of these devices, the operating conditions of these card slots, etc. For example, operating conditions associated with these slots may relate to voltage, plug and play conditions, hot-swap conditions, processor and memory utilization, and so forth. In aspects, the level of detail included in these digital reports may vary. For example, the digital reports may include data specific to an entire device, e.g., data regarding a total number of packets transmitted, received, or dropped by or on a device, per-interface packet statistics, and/or packets communication data specific to a particular communication session. In aspects, the above described data may be voluminous, heterogeneous, and stored in a variety of different formats. As such, deriving a relevant and accurate description of an overall performance of the distributed network 100 may be challenging.

The scoring system of the present disclosure addresses and overcomes these challenges, as described herein. In aspects, the scoring system of the present disclosure may overcome the above described challenges by generating scores that are specific to a system (e.g., a distributed network or a non-distributed network, and so forth). The system may include a distributed network (e.g., distributed network 100) with a plurality of subnetworks (e.g., the first subnetwork 106 and the second subnetwork 114), each of which includes a plurality of devices. Further, in aspects, the server 102 may output the above described data and the generated scores on a display that is communicatively coupled to the server 102. The server 102 may also output recommendations of one or more software patches, device configuration recommendations, and so forth, that may need to be transmitted to various devices of the first subnetwork 106 in order to improve the overall operational efficiency of the first subnetwork 106, namely the operational efficiency of one or more of the devices 108, 110, and 112 of the first subnetwork 106.

For example, based on analyzing the above described data and various scores that are generated, the server 102 may determine that it is advisable to transmit a firmware update to one or both of the devices 108 and 110. In aspects, as both the devices 108 and 110 may belong to different vendors or may correspond to different product versions of the same vendor (e.g., a device may be a legacy device while another device may be the most recent version), product and version specific firmware updates may be provided to each of the devices 108 and 110. Thereafter, the server 102, subsequent to determining that the firmware updates have been completed, may collect additional data regarding various aspects of the devices 108, 110, and 112, e.g., current power consumption levels, memory usage, resource utilization, and so forth. In aspects, the server 102 may then implement the scoring system as described in the present disclosure with respect to the first subnetwork 106 and determine additional scores specific to one or more of the devices 108, 110, and 112.

The additionally determined scores may then be classified within a plurality of categories and a plurality of subcategories. It is noted that, in aspects, the initially generated scores may be classified within a plurality of categories and a plurality of subcategories. Based on user preferences, one or more categories and subcategories may be modified or deleted. In aspects, new categories or subcategories may be added. For example, as illustrated in FIG. 2, scores that are determined with respect to the devices 108, 110, and 112 in the first subnetwork 106 may be determined and classified such that a category score 202, a category score 204, and a category score 206 may be determined. Moreover, scores may also be determined for respective subcategories within each of the categories having the categories scores of 202, 204, and 206. In particular, subcategory score 208 and subcategory score 210 may be determined for various subcategories associated with the category having the category score of 202. Similarly, subcategory scores 212 and 214 may be determined for subcategories associated with the category having the category score of 204, and subcategory scores 216 and 218 may be determined for subcategories associated with the category having the category score of 206. In aspects, these categories may be descriptive of the individual devices, the subnetwork, the individual components of each of the devices 108, 110, and 112, and so forth. In aspects, the categories 202, 204, and 206 may correspond to one of security conditions, authentication, communications, resource utilization, resilience metrics, configuration quality, and so forth, respectively.

In aspects, the scoring system of the present disclosure may also operate such that one category of the plurality of categories may be weighted more prominently than the rest of the categories. For example, in aspects, a user may utilize the server 102 to assign a higher weight value (using a weighting parameter) to the category 202 (e.g., authentication) and the category 204 (e.g., resource utilization), and a lower weight value to the category 206 (e.g., configuration quality). As such, in aspects, when an overall score 200 of the first subnetwork 106 is determined, the score will be skewed or biased such that the overall score 200 will reflect the operating conditions of the first subnetwork 106 based primarily on the analysis of the data specific to the category 202 and the category 204. In aspects, variation of data associated with the category 202 and the category 204 will result in a change in the overall score 200 that would be higher than the variation of data associated with the category 206. In aspects, the category 202 score, the category 204 score, and the category 206 score may be aggregated to generate the overall score 200. In aspects the aggregation of these scores may be expressed by the following expression:

$$\text{Overall Score} = W_1 C_1 + W_2 C_2 + W_3 C_3 \quad (1)$$

In the above expression, the terms $W_1$, $W_2$, and $W_3$ correspond to weighting parameters (e.g., a first weighting parameter, a second weighting parameter, and a third weighting parameter), and the terms $C_1$, $C_2$, and $C_3$ correspond to category scores. In aspects, scores may also be determined and aggregated for subcategories 208 and 210, 212, and 214, and 216 and 218, respectively in order to determine the category 202 score, the category 204 score, and the category 206 score, respectively. In aspects, each of these subcategories may characterize one or more aspects of the categories. For example, for the category of authentication (e.g., the category 202), the subcategories of 208 and 210 may correspond to authentication of administrative access and authentication of user access. In aspects, authentication of infrastructure may be another subcategory under the category of authentication.

It is noted that the scores in the respective subcategories within each category may be aggregated to generate category scores, which in turn may be aggregated to generate an overall score, e.g., overall score 200, which may characterize the overall operating condition of the distributed network 100.

In aspects, it is noted that the determination of scores involves the performance of a plurality of normalization operations. However, in other aspects, the scores may be generated without performing normalization operations. In particular, data that is gathered in relation to each of the categories and subcategories may be in numerical values that may include fractional values, decimal values, low whole numbers, and so forth. Additionally, the data may include non-numeric values. Prior to the determination of the scores, as described above, the numerical characters that include fractional and/or decimal values may be converted to numeric values (e.g., whole numbers) in the range of, e.g., 0 to 10. It is noted that the range of whole numbers may correspond to different value ranges, e.g., 0-20, 0-100, 0-1000, and so forth. Other values ranges are also contemplated. Similarly, the non-numerical values may also be converted to or represented in the form of numeric values (e.g., whole numbers) in the range of, e.g., 0 to 10. In aspects, an example of non-numeric values included in the data may include data associated with an Advanced Encryption Standard (AES) based algorithm or a Data Encryption Standard (DES) based algorithm. Non-numeric values included in the data may also represent some qualitative description such as "high", "normal", or "low" throughput. In yet another example, such non-numeric values may reflect some partitioning such as SNMP messages generated only when some triggering threshold is reached. In aspects, the presence of an AES based algorithm in the distributed network 100 may be associated with a whole number (e.g., 10) and the presence of a DES based algorithm may be associated with another whole number (e.g., 5). Similarly, with respect to numeric characters, data representative of 2.2 Gigabits/second may be represented as 10, while data representative of 1.1 Gigabits/second may be represented as 5. As such, the normalization operation may involve one or more, e.g., rounding, scaling, and/or mapping operations performed on the numeric data. Other comparable conversions are also contemplated.

Further, it is noted that the scores that are determined, as described above, with respect to the first subnetwork 106 are specific to the devices 108, 110, and 112 of the subnetwork. Additionally, in aspects, the scores that are determined with respect to the first subnetwork 106 may be specific to a particular action that was taken by the server 102 with respect to the first subnetwork 106. For example, the scores may characterize the operating conditions that are specific to a time frame that is during or after the completion of, e.g., a software update of the devices, a firmware update of the devices, and so forth. It is noted that modification of the distributed network 100 to, e.g., include new devices, remove existing devices, add an additional subnetwork, and so forth, may require an additional implementation of the scoring system to determine accurate and relevant scores indicative of the operating conditions of the distributed network 100 that is modified.

Figure 3A:
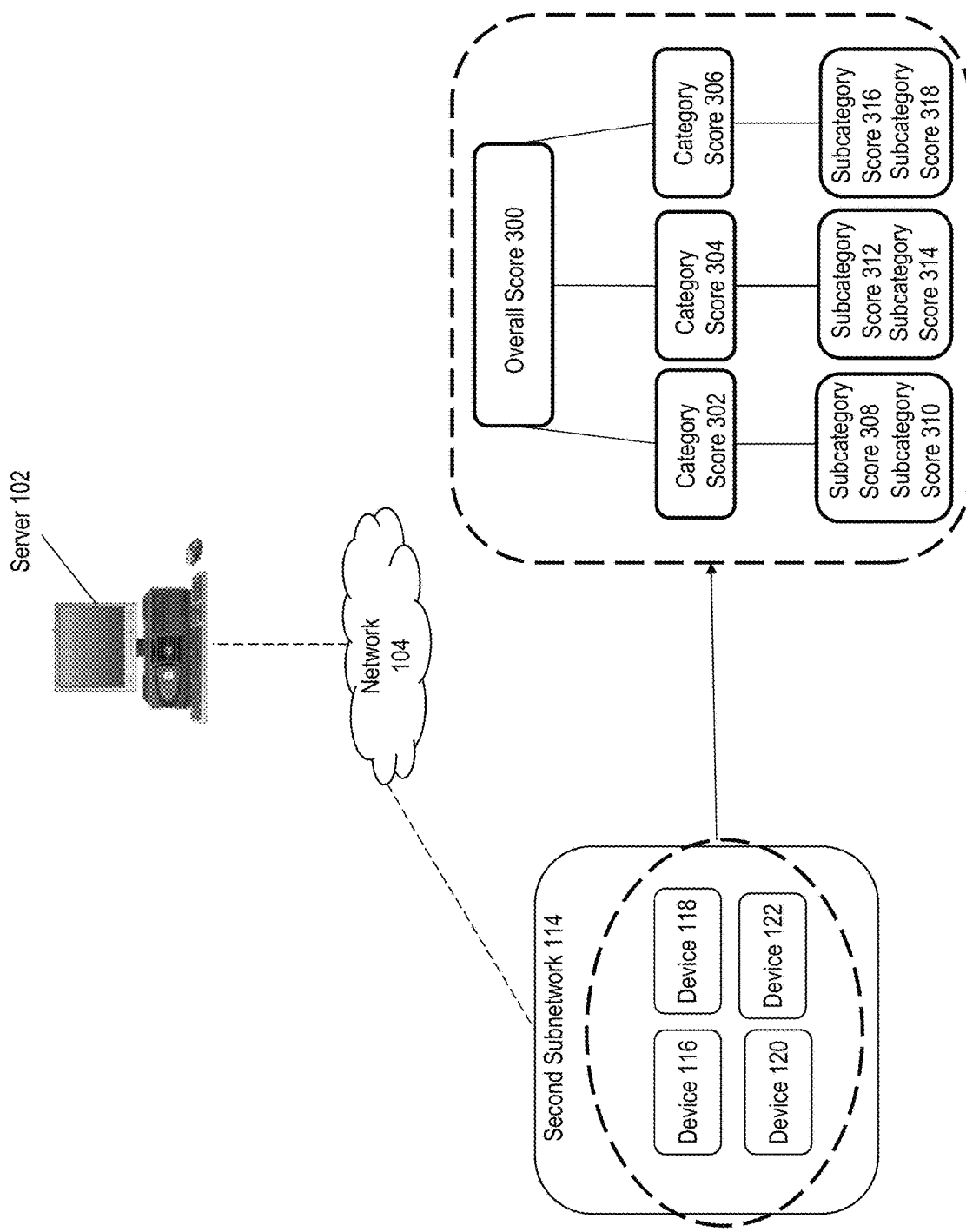
FIG. 3A depicts a representation of an implementation of the scoring system as described in the present disclosure with respect to the second subnetwork that is modified to include an additional device, according to one or more embodiments described and illustrated herein.

FIG. 3A depicts a representation of an implementation of the scoring system as described in the present disclosure the second subnetwork 114 that is modified to include an additional device, according to one or more embodiments described and illustrated herein. It is noted that the types of data, the processes, the normalization operations, and variety of other steps described above with respect to FIG. 2 apply with equal force to the implementation of the scoring system to the second subnetwork 114 that is modified. In aspects, contrary to the first subnetwork 106, the second subnetwork 114 has been modified to include device 112, in addition to the devices 116, 118, and 120 that were previously a part of the second subnetwork 114, as illustrated in FIG. 1. In aspects, various scores may be generated with respect to the second subnetwork 114 that is illustrated in FIG. 1. Thereafter, upon addition of the device 112, an additional set of scores may be determined. For example, after the addition of the device 112 to the second subnetwork 114, an overall score 300 may be generated based on an aggregation of the respective scores of each of the categories. In particular, three separate and distinct categories may have respective category scores of category scores of category score 302, category score 304, and category score 306. Further, subcategories of each of the respective distinct categories may include respective subcategories scores, e.g., subcategory 308, subcategory score 310, subcategory score 312, subcategory score 314, subcategory score 316, and subcategory score 318.

The scoring system described in the present disclosure enables the various scores that are generated to be tractable and easily interpretable, in particular, by providing or presenting the scores with the use of categories or ontologies of categories (e.g., subcategories that are related to each of the categories). It is noted that the categories and ontologies of categories may be implemented on or with respect to various aspects of a system that includes a distributed network, a non-distributed network, and so forth. Categories describe various aspects of a system, e.g., a system that comprises the distributed network 100. Broadly speaking, these categories are designed or selected by users and operators to provide insights to users, operators, and so forth. For example, for a particular type of distributed network 100—TCP/IP networks—categories such as security, communications, resource utilization, resilience, configuration quality, and so forth, may be selected. Further, users may have the option of creating additional categories, modifying existing categories, and providing various preferences. For example, users and operators may specify that the categories of communications and security are more important than the category of resource utilization. As such, the categories of communications and security may be weighted more heavily in the calculation of scores than the category of resource utilization. These weights, which are indicative of user preferences, may be expressed using weight values ($W_i$) in association with each category. Thereafter, as explained in various parts of the present disclosure, the scores across these categories may be aggregated. The expression representing the aggregation of scores across various categories is presented in expression 1 above, in which, "Overall Score=$W_1C_1+W_2C_2+W_3C_3$, in which "W" corresponds to a weight value or weighting parameter and "C" corresponds to a particular category score.

Additionally, ontologies of categories may be defined as extensions of categories or sub-categories. In particular, as illustrated in FIGS. 2 and 3, each of the category scores may be associated with a particular category and each of the subcategory scores located underneath a particular category may be associated with ontologies of categories or subcategories. Details regarding the ontologies of categories are illustrated in FIG. 3B and described in greater detail below.

Figure 3B:
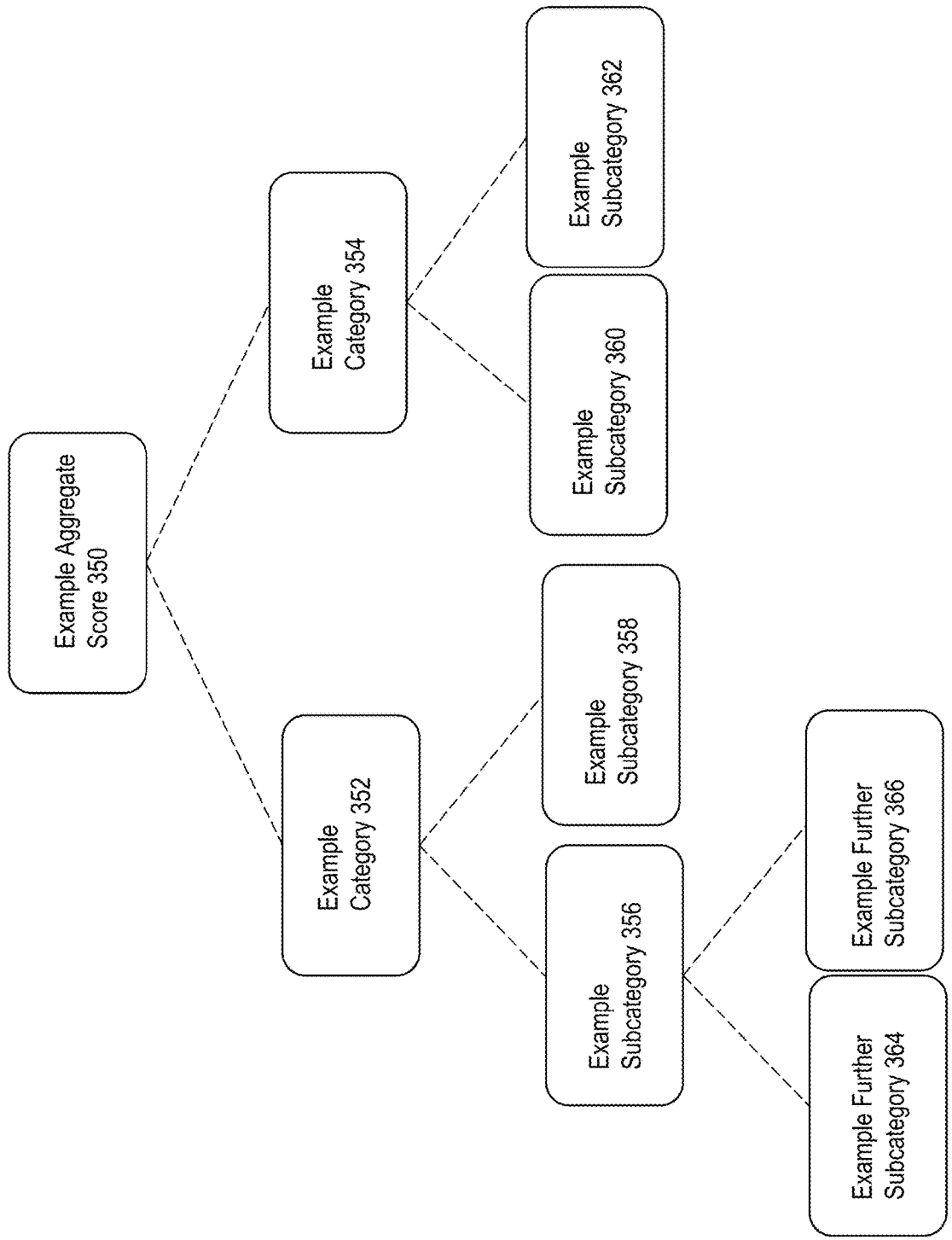
FIG. 3B describes an example graphical representation of an ontology of categories that is utilized by the scoring system of the present disclosure, according to one or more embodiments described and illustrated herein.

FIG. 3B describes an example graphical representation of an ontology of categories that is utilized by the scoring system of the present disclosure, according to one or more embodiments described and illustrated herein. For example, an example aggregate score 350 may be generated based on combining the scores specific to each of the categories, namely example category 352 and example category 354. Further, scores specific to each of the example category 352 and the example category 354 may be determined by combining scores specific to the example subcategory score 356 and example category score 358, and the example subcategory score 360 and the example subcategory score 362, respectively. In aspects, the example subcategories, 356, 358, 360, and 362 correspond to a first level of ontologies of categories, namely a first set of subcategories. In aspects, it is noted that further subcategories may be generated or included with respect to each of the subcategories 356, 358, 360, and 362. For example, the example subcategory 356 may include two further subcategories—example further subcategory 364 and example further subcategory 366.

In aspects, the example subcategory 356 and the example subcategory 358 may correspond to authentication, encryption, and attack resilience. Further, the example subcategory 356 (e.g., authentication) may include additional subcategories of authentication of administrative access, authentication of user access, and so forth. It is noted that other categories such as authentication infrastructure may also be included as an additional example further subcategory. It is also noted that each subcategory, irrespective of the particular layer in which it is positioned, may be modified such that additional subcategories may be associated or included within these subcategories.

In aspects, scoring aggregation for various ontologies is substantially similar to the aggregation or combination of scores of the categories to generate an aggregate score. However, the aggregation of scores for the sub-categories (e.g., ontologies of categories) is different from the aggregation of scores for categories in that the aggregation of scores for the subcategories (e.g., ontologies) may be derived iteratively, e.g., by a level-by-level weighted summation based aggregation. At each ontology level, users or operators have the option of assigning values in the form of weights to each of the scores associated with each of the subcategories and any additional categories. As stated above, the weights or weighting parameters are indicative of an importance of a particular subcategory to a user and the importance of the subcategory relative to other subcategories.

An advantage of the use of ontologies as part of the implementation of the scoring system of the present disclosure is that these ontologies enable better interpretability of the generated scores as well as providing an in-depth, detailed, and comprehensive explanation of various factors associated with the operation of a system, e.g., a root cause analysis of various problems associated with a distributed network, a non-distributed network, and so forth. For example, if a particular aggregate score is, e.g., 9.5, it may be due to an aggregation of the scores of multiple categories, e.g., an aggregation of a score of 9.2 for a security category with a score of 10 for a communications category, and a score of 8 for a resource utilization category. Thereafter, a user or operator may also be able to determine the factors that resulted in a particular score for a particular category. For example, the score of 9.2 for the security category may be based on an aggregation of the scores of various subcategories of 9.8, 8.5, and 9.1.

While the scoring system described above involves the use of categories and subcategories, which correspond to a particular type of hierarchy, the scoring system of the present disclosure may also be implemented with respect to a different type of hierarchy, e.g., an organizational or infrastructure based hierarchy. With respect to such hierarchies, a first level of such a hierarchy may correspond to various sites or subnetworks of a company (e.g., United States, EMEA, APAC, Headquarters of a company, Branch Offices, and so forth). A second level of the hierarchy may correspond to departments within the first level such as Engineering, Finance, Marketing, and so forth. Additional levels under the second level may also be included. Another level may be included and may correspond to, e.g., types of devices such as Routers, Switches, Access Points, and so forth).

Finally, levels that correspond to subcomponents of these devices may also be included. In aspects, it is noted that, as a result of the implementation of the scoring system of the present disclosure, scores may be generated for parts, aspects, or entities at each level within this hierarchy and a combined score may be generated for each level based on aggregation of scores of the parts, aspects, or entities associated with each level. The level associated with companies may include scores for each company and an aggregate company score and the level associated with departments within each company may include scores for each department and an aggregate score based on combining the scores across these departments. Thereafter, scores across each level may be aggregated to generate an aggregate score for the entire system. In aspects, it is noted that hierarchical score aggregation provides indications of an average measure of scores at a particular level and a measure of variability of scores within a particular level. As such, implementation of the scoring system described herein enables users and operators to better understand how parts of a higher level (e.g., one or more devices at a higher level) and parts of a lower level (e.g., one or more devices at a lower level) function. Knowledge about such functionality enables users and operators to identify and troubleshoot problems within a system. Moreover, the scoring system may also indicate variability of scores across a time frame, which may provide information about whether devices at a particular level are operating with limited effectiveness.

Figure 4:
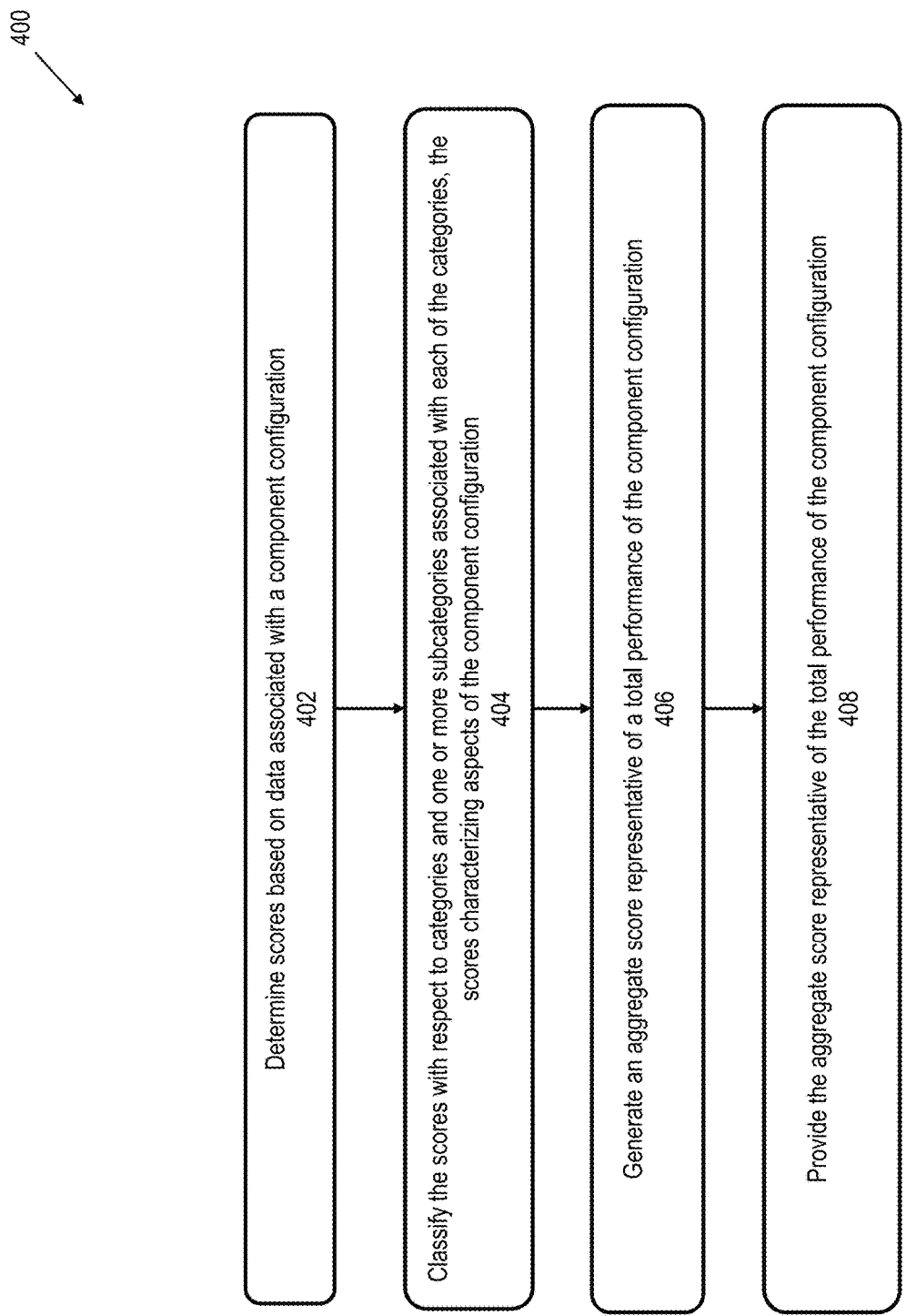
FIG. 4 depicts a flow diagram for implementing the scoring system of the present disclosure, according to one or more embodiments described and illustrated herein.

FIG. 4 depicts a flow diagram 400 for implementing the scoring system of the present disclosure, according to one or more embodiments described and illustrated herein.

At block 402, scores based on data associated with a component configuration may be determined. A component configuration corresponds to a particular device that operates one or more software applications. In aspects, data associated with the device may correspond to data regarding interface states, whether the particular interface cards that are present in various slots of the device, the operating conditions of these card slots, current power consumption levels, memory usage, resource utilization, and so forth. It is noted that these are non-limiting examples.

At block 404, the scores that are determined with respect to a plurality of categories and a plurality of subcategories associated with each of the plurality of categories may be classified. In aspects, a subset of the scores may characterize a subset of the plurality of devices. Further, as described above, examples of categories may include security conditions, authentication, communications, resource utilization, resilience metrics, configuration quality, and so forth, and subcategories may correspond to particular aspects of each of these categories. For example, for the category of authentication, subcategories may correspond to authentication of administrative access, authentication of user access, and authentication of infrastructure.

At block 406, an aggregate score representative of an aggregate performance of the component configuration, which may be included as part of a system (e.g., a distributed network, a non-distributed network, etc.), may be generated. In aspects, the aggregate score may be generated by combining scores that are specific to or which are associated with particular categories. Further, each of the category scores may be generated by combining one or more scores associated with each subcategory within each of the categories. Further, the generation of category scores and subcategories scores may involve applying weighting parameters. For example, weighting parameters may be applied to one or more of the calculated or determined subcategory score subsequent to or concurrently with the combining of one subcategory score with another subcategory score. Weighting parameters may also be applied to category scores in a similar manner. Additionally, in aspects, one or more normalization operations may be performed on the category scores and the subcategories scores.

At block 408, the aggregate score may be provided. In aspects, the providing of the aggregate score may be, e.g., displaying, storing, further processing, and/or transmitting of the aggregate score. For example, the aggregate score (e.g., overall score 200 and overall score 300) may be output on a display that is communicatively coupled to the server 102. It is noted that other scores, e.g., scores specific to categories and subcategories, may also be output on the display coupled to the server 102.

Figure 5:
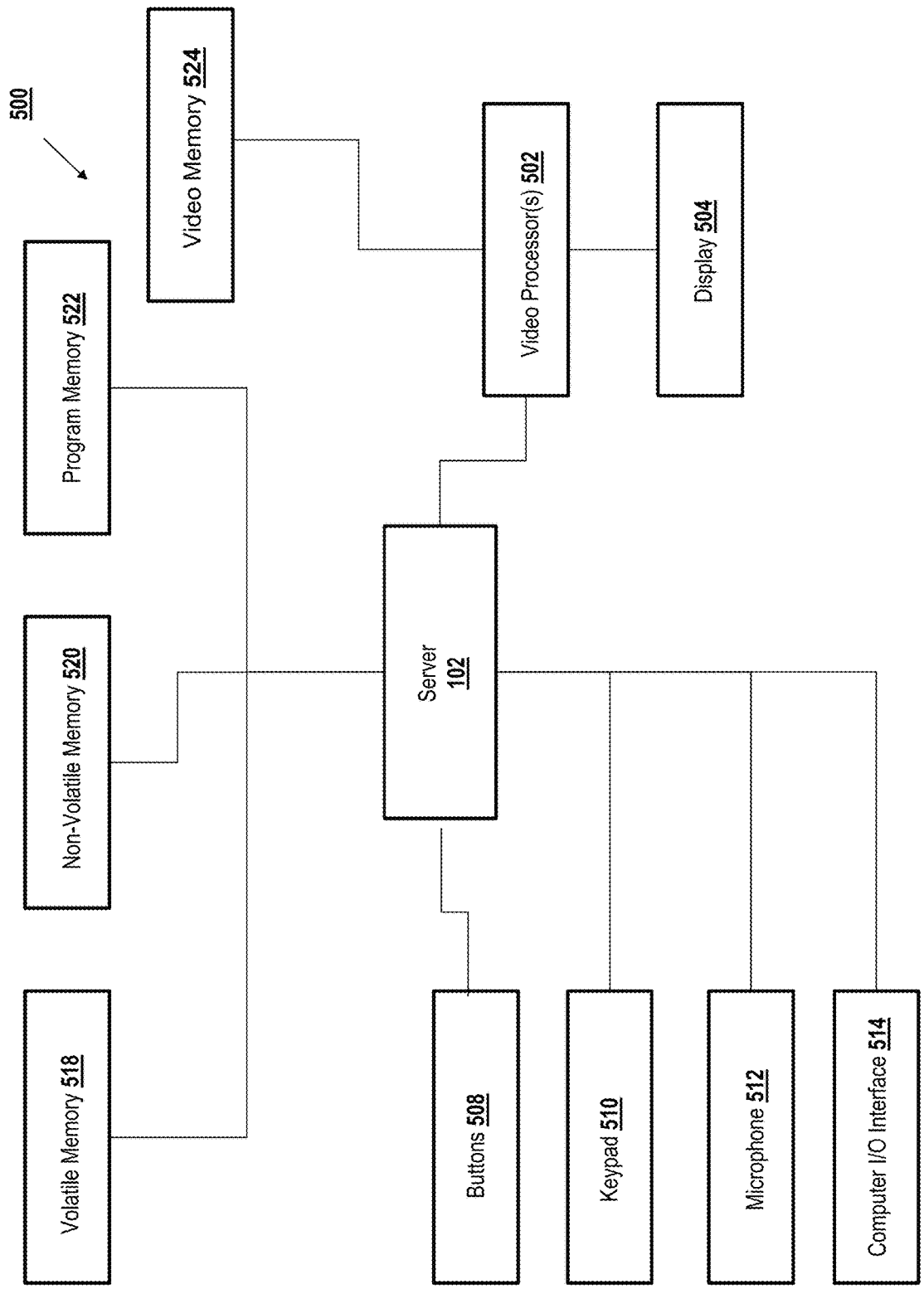
FIG. 5 depicts a server that may implement the scoring system as described in the present disclosure, according to some embodiments, in accordance with some embodiments.

FIG. 5 depicts server 102 that may implement the scoring system as described in the present disclosure, according to some embodiments, in accordance with some embodiments. The computing system 500 may include the server 102 that is communicatively coupled (wired or wirelessly coupled) to a display 504, a keypad 510 (e.g., a keyboard) one or more sensors implanted in the brain of a patient, and one or more brain machine interfaces that are external to the server 102. The server 102 may also include video processors 502, buttons 508, a microphone 512, a computer input/output interface 514, memory in the form of volatile memory 518, non-volatile memory 520, and program memory 522.

The video processors 502 can provide/receive commands, status information, streaming video, still video images, and graphical overlays to/from the server 102 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The server 102 can be used to manage the user interface by receiving input via buttons 508, keypad 510, and/or microphone 512, in addition to providing a host of other functions, including image, video, and audio storage and recall functions, system control, and measurement processing. The buttons 508 and/or keypad 510 also can be used for menu selection, providing user commands, and so forth.

The video processors 502 can also communicate with video memory 524, which is used by the video processors 502 for frame buffering and temporary holding of data during processing. The server 102 can also communicate with program memory 522 for storage of programs executed by the server 102. In addition, the server 102 can be in communication with the volatile memory 518 (e.g., RAM), and the non-volatile memory 520 (e.g., flash memory device, a hard drive, a DVD, or an EPROM memory device). The non-volatile memory 520 is the primary storage for streaming video and still images.

The server 102 can also be in communication with a computer input/output interface 514, which provides various interfaces to peripheral devices and networks, such as USB, Firewire, Ethernet, audio I/O, and wireless transceivers. This computer input/output interface 514 can be used to save, recall, transmit, and/or receive still images, streaming video, or audio. For example, a USB "thumb drive" or CompactFlash memory card can be plugged into computer input/output interface 514. In addition, the computing system 500 can be configured to send frames of image data or streaming video data to an external computer or server. The computing system 500 can incorporate a TCP/IP communication protocol suite and can be incorporated in a wide area network including a plurality of local and remote computers, each of the computers also incorporating a TCP/IP communication protocol suite.

Further non-limiting aspects or embodiments are set forth in the following numbered examples:

Example 1: A computer-implemented method comprising: determining scores based on data associated with a component configuration; classifying the scores with respect to categories and one or more subcategories associated with each of the categories, the scores characterizing aspects of the component configuration; generating an aggregate score representative of a total performance of the component configuration, the generating including: generating a first category score specific to a first category of the categories and a second category score specific to a second category of the categories, performing normalization operations on the first category score and the second category score, wherein the first category score is representative of a first characteristic of the component configuration and the second category score representative of a second characteristic of the component configuration; combining the first category score that is normalized with the second category score that is normalized; and providing the aggregate score representative of an aggregate performance of the component configuration based on the first characteristic and the second characteristic.

Example 2: The computer-implemented method of example 1, wherein: the generating of the first category score comprises: determining a first subcategory score associated with a first subcategory specific to the first category and a second subcategory score associated with a second subcategory specific to the first category, and combining the first subcategory score and the second subcategory score; and the generating of the second category score comprises: determining a first subcategory score associated with a first subcategory specific to the second category and a second subcategory score associated with a second subcategory specific to the second category, and combining the first subcategory score associated with the first subcategory specific to the second category and the second subcategory score associated with the second subcategory specific to the second category.

Example 3: The computer-implemented method of example 1 or 2, further comprising applying a first weighting parameter to the combination of the first subcategory score specific to the first category and the second subcategory score specific to the first category.

Example 4: The computer-implemented method of any one of examples 1-3, further comprising applying a second weighting parameter to the combination of the first subcategory score specific to the second category and the second subcategory score specific to the second category, wherein the first weighting parameter is larger than the second weighting parameter.

Example 5: The computer-implemented method of any of examples 1-4, further comprising: implementing an action specific to at least a device included in the component configuration; and generating an additional aggregate score representative of a different aggregate performance of the component configuration.

Example 6: The computer-implemented method of any one of examples 1-5, wherein: the action specific to the device includes one or more of a memory allocation, a firmware update, a communication path assignment, selection of authentication processes, or an assignment of access control policies; and the data associated with the device includes a plurality of numeric characters and a plurality of non-numeric values.

Example 7: The computer-implemented method of any one of examples 1-6, wherein the determining of the scores comprises performing conversion operations on the plurality of non-numeric values.

Example 8: The computer-implemented method of any one of examples 1-7, wherein the performing of the conversion operations comprising corresponding the plurality of non-numeric values to numeric values in a range from 0 to 10.

Example 9: The computer-implemented method of any one of examples 1-8, wherein the plurality of non-numeric values correspond to an AES algorithm and a DES algorithm.

Example 10: The computer-implemented method of any of examples 1-9, the first category score is representative of a volume of forwarded data relative to a device of the component configuration, volume of dropped traffic sessions relative to one or more devices of the component configuration, a number of traffic sessions, or communication paths between devices of the component configuration; and the second category score is representative of access delays based on authentication processes relative to the one or more devices of the component configuration or alerts associated with detections relative to one or more of devices of the component configuration.

Example 11: A system comprising: at least one data processor; and at least one memory storing instructions, which when executed by the at least one data processor, cause operations comprising: determining scores based on data associated with a component configuration; classifying the scores with respect to categories and one or more subcategories associated with each of the categories, the scores characterizing aspects of the component configuration; generating an aggregate score representative of a total performance of the component configuration, the generating including: generating a first category score specific to a first category of the categories and a second category score specific to a second category of the categories, performing normalization operations on the first category score and the second category score, wherein the first category score is representative of a first characteristic of the component configuration and the second category score representative of a second characteristic of the component configuration, combining the first category score that is normalized with the second category score that is normalized; and providing the aggregate score representative of an aggregate performance of the component configuration based on the first characteristic and the second characteristic.

Example 12: The system of example 10 or example 11, wherein the operations further comprise the generating of the first category score comprises: determining a first subcategory score associated with a first subcategory specific to the first category and a second subcategory score associated with a second subcategory specific to the first category, and combining the first subcategory score and the second subcategory score, and the generating of the second category score comprises: determining a first subcategory score associated with a first subcategory specific to the second category and a second subcategory score associated with a second subcategory specific to the second category, and combining the first subcategory score associated with the first subcategory specific to the second category and the second subcategory score associated with the second subcategory specific to the second category.

Example 13: The system of any of examples 10-12, wherein the operations further comprise applying a first weighting parameter to the combination of the first subcategory score specific to the first category and the second subcategory score specific to the first category.

Example 14: The system of any of examples 10-13, wherein the operations further comprise applying a second weighting parameter to the combination of the first subcategory score specific to the second category and the second subcategory score specific to the second category, wherein the first weighting parameter is larger than the second weighting parameter.

Example 15: The system of any of examples 11-14, wherein one of the operations of implementing an action specific to at least a device included in the component configuration; and generating an additional aggregate score representative of a different aggregate performance of the component configuration.

Example 16: The system of any of examples 11-15, wherein the action specific to the device includes one or more of a memory allocation, a firmware update, a communication path assignment, selection of authentication processes, or an assignment of access control policies; and the data associated with the device includes a plurality of numeric characters and a plurality of non-numeric values.

Example 17: The system of any of examples 11-16, wherein one of the operations of the determining of the scores comprises performing conversion operations on the plurality of non-numeric values.

Example 18: The system of any of examples 11-17, wherein one of the operations of the performing of the conversion operations comprise corresponding the plurality of non-numeric values to numeric values in a range from 0 to 10.

Example 19: The system of any of examples 11-18, wherein the plurality of non-numeric values correspond to an AES algorithm and a DES algorithm.

Example 20: The system of any of examples 11-19, wherein: the first category score is representative of a volume of forwarded data relative to a device of the component configuration, volume of dropped traffic sessions relative to one or more devices of the component configuration, a number of traffic sessions, or communication paths between devices of the component configuration; and the second category score is representative of access delays based on authentication processes relative to the one or more devices of the component configuration or alerts associated with detections relative to one or more devices of the component configuration.

What is claimed is:

1. A computer-implemented method comprising:
    determining a first set of scores based on data associated with a component configuration, the first set of scores being associated with a first level of a hierarchy;
    determining a second set of scores associated with a second level of the hierarchy;
    classifying the first set of scores with respect to categories and one or more subcategories associated with each of the categories, the first set of scores characterizing aspects of the component configuration;
    generating an aggregate score representative of a total performance of the component configuration, the generating including:
        generating a first category score specific to a first category of the categories and a second category score specific to a second category of the categories,
        performing normalization operations on the first category score and the second category score, wherein the first category score is representative of a first characteristic of the component configuration and the second category score representative of a second characteristic of the component configuration, and
        combining the first category score that is normalized with the second category score that is normalized; and
    providing the aggregate score representative of the total performance of the component configuration.

2. The computer-implemented method of claim 1, wherein:
    the generating of the first category score comprises:
        determining a first subcategory score associated with a first subcategory specific to the first category and a second subcategory score associated with a second subcategory specific to the first category, and
        combining the first subcategory score and the second subcategory score; and
    the generating of the second category score comprises:
        determining a first subcategory score associated with a first subcategory specific to the second category and a second subcategory score associated with a second subcategory specific to the second category, and
        combining the first subcategory score associated with the first subcategory specific to the second category and the second subcategory score associated with the second subcategory specific to the second category.

3. The computer-implemented method of claim 2, further comprising applying a first weighting parameter to the combination of the first subcategory score specific to the first category and the second subcategory score specific to the first category.

4. The computer-implemented method of claim 3, further comprising applying a second weighting parameter to the combination of the first subcategory score specific to the second category and the second subcategory score specific to the second category, wherein the first weighting parameter is larger than the second weighting parameter.

5. The computer-implemented method of claim 1, further comprising:
    implementing an action specific to at least a device included in the component configuration; and
    generating an additional aggregate score representative of a different aggregate performance of the component configuration.

6. The computer-implemented method of claim 5, wherein:
    the action specific to the device includes one or more of a memory allocation, a firmware update, a communication path assignment, selection of authentication processes, or an assignment of access control policies; and
    the data associated with the device includes a plurality of numeric characters and a plurality of non-numeric values.

7. The computer-implemented method of claim 6, wherein the determining of the first set of scores comprises performing conversion operations on the plurality of non-numeric values.

8. The computer-implemented method of claim 7, wherein the performing of the conversion operations comprising corresponding the plurality of non-numeric values to numeric values in a range from 0 to 10.

9. The computer-implemented method of claim 7, wherein the plurality of non-numeric values correspond to an AES algorithm and a DES algorithm.

10. The computer-implemented method of claim 1, wherein:
    the first category score is representative of a volume of forwarded data relative to a device of the component configuration, volume of dropped traffic sessions relative to one or more devices of the component configuration, a number of traffic sessions, or communication paths between devices of the component configuration; and
    the second category score is representative of access delays based on authentication processes relative to the one or more devices of the component configuration or alerts associated with detections relative to one or more of devices of the component configuration.

11. The computer-implemented method of claim 1, wherein the normalization operations performed on the first category score and the second category score include one or more of a rounding operation and a mapping operation.

12. The computer-implemented method of claim 1, wherein the component configuration characterizes one or more of default settings of a device in a distributed computing system, initial settings of the device, options of the device, preferences of the device, and parameters governing operation of the device.

13. A system comprising:
   at least one data processor; and
   at least one memory storing instructions, which when executed by the at least one data processor, cause operations comprising:
      determining a first set of scores based on data associated with a component configuration, the scores being associated with a first level of a hierarchy;
      determining a second set of scores associated with a second level of the hierarchy;
      classifying the first set of scores with respect to categories and one or more subcategories associated with each of the categories, the first set of scores characterizing aspects of the component configuration;
      generating an aggregate score representative of a total performance of the component configuration, the generating including:
         generating a first category score specific to a first category of the categories and a second category score specific to a second category of the categories,
         performing normalization operations on the first category score and the second category score, wherein the first category score is representative of a first characteristic of the component configuration and the second category score representative of a second characteristic of the component configuration, and
         combining the first category score that is normalized with the second category score that is normalized; and
      providing the aggregate score representative of the total performance of the component configuration.

14. The system of claim 13, wherein the operations of:
   the generating of the first category score comprises:
      determining a first subcategory score associated with a first subcategory specific to the first category and a second subcategory score associated with a second subcategory specific to the first category, and
      combining the first subcategory score and the second subcategory score; and
   the generating of the second category score comprises:
      determining a first subcategory score associated with a first subcategory specific to the second category and a second subcategory score associated with a second subcategory specific to the second category, and
      combining the first subcategory score associated with the first subcategory specific to the second category and the second subcategory score associated with the second subcategory specific to the second category.

15. The system of claim 14, wherein the operations further comprise applying a first weighting parameter to the combination of the first subcategory score specific to the first category and the second subcategory score specific to the first category.

16. The system of claim 15, wherein the operations further comprise applying a second weighting parameter to the combination of the first subcategory score specific to the second category and the second subcategory score specific to the second category, wherein the first weighting parameter is larger than the second weighting parameter.

17. The system of claim 13, wherein the operations further comprise:
   implementing an action specific to at least a device included in the component configuration; and
   generating an additional aggregate score representative of a different aggregate performance of the component configuration.

18. The system of claim 17, wherein:
   the action specific to the device includes one or more of a memory allocation, a firmware update, a communication path assignment, selection of authentication processes, or an assignment of access control policies; and
   the data associated with the device includes a plurality of numeric characters and a plurality of non-numeric values.

19. The system of claim 18, wherein one of the operations of the determining of the first set of scores comprises performing conversion operations on the plurality of non-numeric values.

20. The system of claim 19, wherein one of the operations of the performing of the conversion operations comprise corresponding the plurality of non-numeric values to numeric values in a range from 0 to 10.

21. The system of claim 19, wherein the plurality of non-numeric values correspond to an AES algorithm and a DES algorithm.

22. The system of claim 13, wherein:
   the first category score is representative of a volume of forwarded data relative to a device of the component configuration, volume of dropped traffic sessions relative to one or more devices of the component configuration, a number of traffic sessions, or communication paths between devices of the component configuration; and
   the second category score is representative of access delays based on authentication processes relative to the one or more devices of the component configuration or alerts associated with detections relative to one or more of devices of the component configuration.

* * * * *